US 8,875,426 B2

(12) United States Patent
Wagner

(10) Patent No.: US 8,875,426 B2
(45) Date of Patent: Nov. 4, 2014

(54) SIGNAGE SYSTEM

(76) Inventor: Mark W. Wagner, Boylston, MA (US)

( * ) Notice: Subject to any disclaimer, the term of this patent is extended or adjusted under 35 U.S.C. 154(b) by 677 days.

(21) Appl. No.: 12/994,045

(22) PCT Filed: May 25, 2009

(86) PCT No.: PCT/US2009/045102
§ 371 (c)(1),
(2), (4) Date: Mar. 3, 2011

(87) PCT Pub. No.: WO2009/143502
PCT Pub. Date: Nov. 26, 2009

(65) Prior Publication Data
US 2011/0146119 A1    Jun. 23, 2011

Related U.S. Application Data

(60) Provisional application No. 61/055,920, filed on May 23, 2008.

(51) Int. Cl.
*G09F 21/04* (2006.01)
*G09F 9/33* (2006.01)

(52) U.S. Cl.
CPC . *G09F 21/04* (2013.01); *G09F 9/33* (2013.01)
USPC .................. 40/591; 40/593; 40/446; 40/452

(58) Field of Classification Search
CPC ....... G09F 13/005; G09F 21/00; G09F 21/04; G09F 21/048; G09G 5/00
USPC .......................... 40/591–593, 446, 447, 452; 296/97.7–97.8
See application file for complete search history.

(56) References Cited

U.S. PATENT DOCUMENTS

| | | | |
|---|---|---|---|
| 4,928,084 A * | 5/1990 | Reiser | 340/479 |
| 5,636,462 A * | 6/1997 | Kleiman | 40/452 |
| 5,914,698 A * | 6/1999 | Nicholson et al. | 345/1.3 |
| 6,300,870 B1 * | 10/2001 | Nelson | 340/468 |

(Continued)

FOREIGN PATENT DOCUMENTS

GB         2256074 A  * 11/1992

*Primary Examiner* — Casandra Davis
(74) *Attorney, Agent, or Firm* — Gerry A. Blodgett; David J. Blodgett; Blodgett & Blodgett, P.C.

(57) ABSTRACT

A signage system (10) including one or more visual display devices (11), each mounted for display behind the windshield (15) of one or more parked and ignition-off vehicles (16). Each sign (11) has a visual display surface (12) that is capable of forming an illuminated graphic display (13) on the visual display surface (12). The visual display surface (12) would be visible to observers in front of the vehicle (16). The system (10) includes wireless communication hardware (60) that allows the visual display (11) to be programmed by a remote programming device (41). Each of the display devices (11) can be programmed to have a separate message and each message would scroll from left to right across the display surface (12) in a time coordinated manner so that the message appears to scroll consistently from left to right across the visual field of the plurality of display surfaces (12).

14 Claims, 2 Drawing Sheets

(56) References Cited

U.S. PATENT DOCUMENTS

| | | | |
|---|---|---|---|
| 6,880,276 B2* | 4/2005 | Strein et al. | 40/442 |
| 7,020,992 B1* | 4/2006 | Christie | 40/593 |
| 2002/0009978 A1* | 1/2002 | Dukach et al. | 455/99 |
| 2003/0227375 A1* | 12/2003 | Yong | 340/425.5 |
| 2004/0097195 A1* | 5/2004 | Selleck | 455/41.3 |
| 2004/0239493 A1* | 12/2004 | Miller | 340/471 |
| 2005/0274050 A1* | 12/2005 | Liu | 40/544 |
| 2013/0307706 A1* | 11/2013 | Kriezman | 340/988 |

* cited by examiner

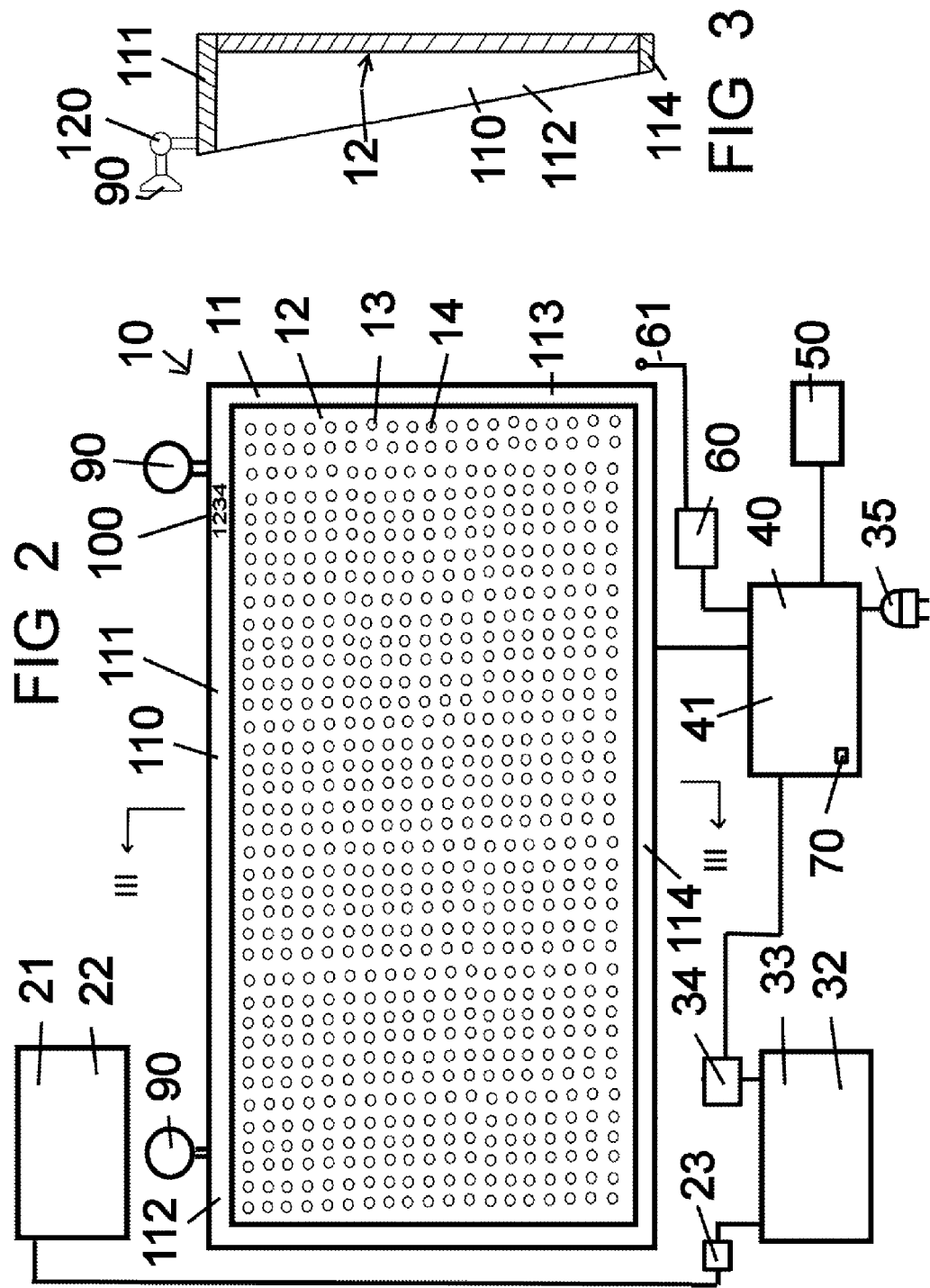

SIGNAGE SYSTEM

TECHNICAL FIELD

This invention involves a illuminated signage system for outdoor advertising.

BACKGROUND ART

Outdoor signage systems face a number of challenges. First of all, unless the signage systems are illuminated, they are of limited visibility at night. Eliminating the signage systems requires the provision of electric power which normally involves running long power lines. Furthermore, local regulations often restrict the use of outdoor signage. The installation of signage systems can be very complicated and time-consuming. Furthermore, the adaption of signage system messages so that the message can be appropriate can involve significant complications.

These and other difficulties experienced with the prior art devices have been obviated in a novel manner by the present invention.

It is, therefore, an outstanding object of some embodiments of the present invention to provide a signage system that is easy to install.

It is a further object of some embodiments of the invention to provide a signage system that can be illuminated so that it has high visibility even that night.

It is a further object of some embodiments of the invention to provide a signage system that can be illuminated using minimum power technology.

It is a further object of some embodiments of the invention to provide a signage system that can be illuminated by solar power.

It is a further object of some embodiments of the invention to provide a signage system whose message can be easily modified, including modification from remote sources.

It is a further object of some embodiments of the invention to provide a signage system that can include several display units each of which can be programmed with a separate message or a coordinated message.

It is a further object of some embodiments of the invention to provide a signage system that can be located inside of a vehicle so that it is not subject to outside signage restrictions.

It is a further object of some embodiments of the invention to provide a signage system that can be located inside of a vehicle so that it is not subject to weather conditions to which outside signage is normally exposed.

With these and other objects in view, as will be apparent to those skilled in the art, the invention resides in the combination of parts set forth in the specification and covered by the claims appended hereto, it being understood that changes in the precise embodiment of the invention herein disclosed may be made within the scope of what is claimed without departing from the spirit of the invention.

BRIEF SUMMARY OF THE INVENTION

This invention involves several embodiments, and generally involves a signage system (10) including one or more visual display devices (11), each of which is mounted for display behind the windshield (15) of one or more parked and ignition-off vehicles (16). The sign (11) has a visual display surface (12) that is capable of forming an illuminated graphic display (13) on the visual display surface (12). The visual display surface (12) would be placed adjacent the windshield (15) of a vehicle (16) so that the visual display surface (12) would be visible to observers in front of the vehicle (16). The system (10) includes wireless communication hardware (60) that allows the visual display (11) to be programmed by a remote programming device (41). Each of the display devices (11) can be programmed so that each would have a separate message and each message would scroll from left to right across the display surface (12) in a time coordinated manner so that the message appears to scroll consistently from left to right across the visual field of the plurality of display surfaces (12).

BRIEF DESCRIPTION OF THE SEVERAL VIEWS OF THE DRAWING

The character of the invention, however, may best be understood by reference to one of its structural forms, as illustrated by the accompanying drawings, in which:

FIG. 2 is a schematic view of some of the elements included in a signage system embodying the principles of the present invention, and FIG. 3 is a sectional right elevation view taken along the line III-III of FIG. 2.

DETAILED DESCRIPTION OF THE INVENTION

Figure 1:
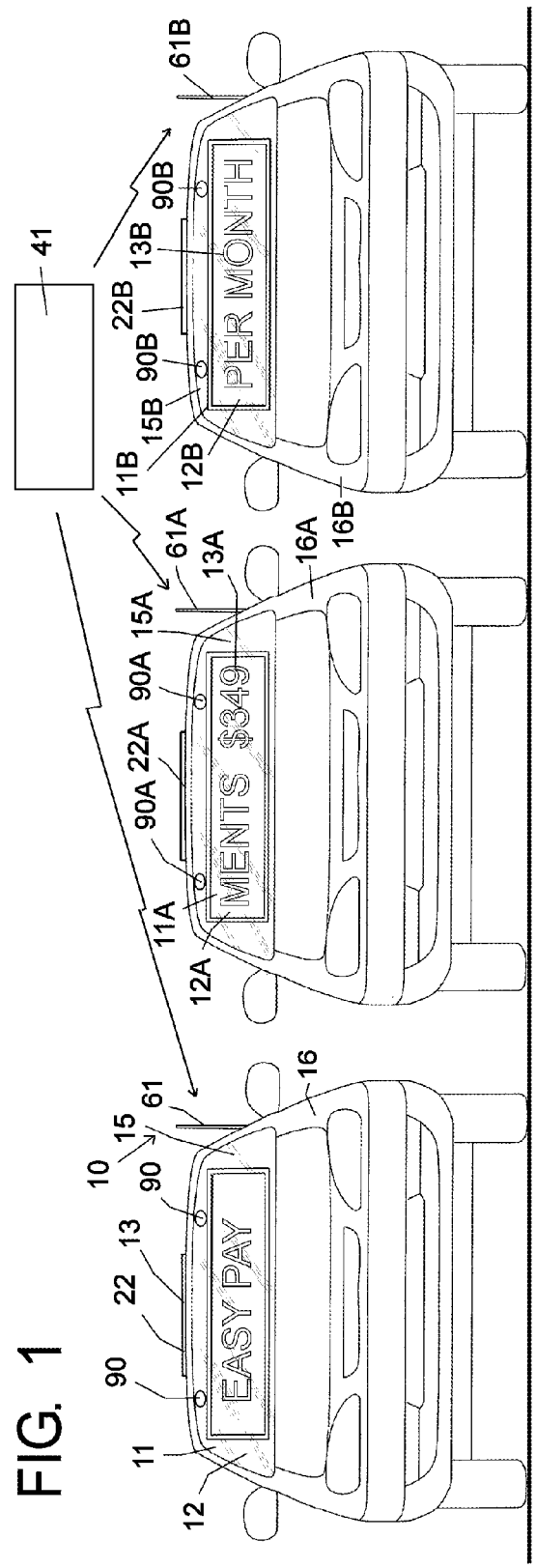
FIG. 1 is a schematic front elevation view of an embodiment of the signage system embodying the principles of the present invention.

This invention is a signage system, including a visual display device that is mounted inside of a vehicle so that the visual display device presents a visual display surface to the front windshield of the vehicle. The signage system is adapted to present a message and particularly a marketing and sales message appropriate for the particular vehicle in which the device is mounted, two members of the public who can see the windshield of vehicle. In the preferred embodiment of this invention, the system is mounted in a plurality of adjacent vehicles, and the message presented by the signage system in each vehicle is coordinated. For example, the message might appear to move from one vehicle to the next in order to create an effective visual effects.

Description: A signage system for communicating to the public, a marketing and sales message appropriate for the vehicle, by means a display device that presents of a matrix of highly efficient light emitting diodes (LEDs), mounted on a display surface, through the windshield. The device is designed to fit inside of the windshield of a vehicle. The LED components have low energy usage, have maximum angle visibility, and have a long life. In the preferred embodiment of this invention, the display is programmable, so that it has a variable message capability. In the preferred embodiment of this invention, the display device is attached to the inside of the window with a system of suction cups. In the preferred embodiment of this invention, need to display device has a flexible frame structure, and a combination of support ribs and exterior clear plastic, so that the flexible frame and housing allow the device to contour to the inside surface of the windshield. In the preferred embodiment of this invention, the device would be battery powered for portability, and would include a solar panel that would recharge the battery. The system would include day and night sensor to control the intensity of the display and a timer that controls on and off condition of the device, for example over a daily or weekly cycle. The system would include computer connection capabilities, such as a USB port to allow laptop programming of the display device. The system might also include a highly visible identification number to aid with programming the display, and wireless capable antenna for programming with a local or remote computer or laptop.

Field of Invention: This invention relates generally to the field of electronic signage and more specifically to a system including a visual display device that is adapted to the mounted in a vehicle and attached to the inside surface of the front windshield of a vehicle, for communicating a marketing and sales message appropriate for the particular vehicle in which it is housed.

Summary: In accordance with a preferred embodiment of the invention, there is disclosed a system for communicating a marketing and sales message appropriate for a vehicle comprising: a highly efficient LED sign designed to fit in the windshield of a vehicle. The LED components have low energy consumption. The LED components have maximum angle visibility. The system has programmable message capability, so that the message can be changed as desired. In the preferred embodiment, the sign would be attached to the inside of the windshield of a vehicle with a system of suction cups. The sign would have a flexible frame structure, in which a housing is a combination of support ribs and exterior clear plastic. The flexible frame and housing allow the ability to contour with the inside surface of the windshield. The system would preferably be battery powered for portability, and preferably would be powered by a solar rechargeable battery. The system would include a day and night sensor, and timer that could control on and off capabilities of the system. The system would include a computer connection such as a USB port to allow laptop programming. The system would include highly visible identification number to aid with programming. The system would include wireless capable antenna for programming with laptop or other computer.

In accordance with a preferred embodiment of the invention, there is disclosed a process for communicating a marketing and sales message appropriate for the individual vehicle comprising the steps of: placing a highly efficient LED sign, designed to fit in the windshield of a vehicle, so that the sign presents a visual message through the windshield of the vehicle to observers in front of the vehicle. The sign is attached to the inside of the window with a system of suction cups, and because the sign has a flexible frame structure, and a housing that is a combination of support ribs and exterior clear plastic, the flexible frame and housing allow the sign to conform in shape to the contour with the inside surface of the windshield. The sign includes LED components that have low energy consumption, and have maximum angle visibility. The assignment which has, programmable message capability, is then programmed so that the selected message is presented.

The sign includes a computer connection such as a USB port to allow local or remote laptop or other computer programming, highly visible identification number to aid with programming, and wireless capable antenna for programming with local or remote laptop or other computer. The sign is then set to display the message, the sign being battery powered for portability, and having solar rechargeable battery, and a day and night sensor, timer that controls on and off capabilities.

Qualities & Benefits: Some of the various embodiments of the signage system of the present invention are designed to provide a direct way to market to the potential client.

They are further designed to provide an accurate product specific message between the vehicle and potential client to provide a wide array of messages that can be created. They are further designed to provide a highly visible message to drive-by traffic. They are further designed to provide a highly visible message to foot traffic. They are further designed to provide a way to have a roadside message. They are further designed to provide a direct way to articulate several messages at the same time. They are further designed to provide a highly concentrated message that is vehicle or marketing program specific to the vehicle. They are further designed to provide a direct way to explain important vehicle specific information to the potential passer-by or foot traffic. They are further designed to provide a direct way to market a message at the best possible drive or foot traffic periods. They are further designed to provide a high level of security by being placed in the vehicle. They are further designed to comply with various zoning ordinances because the sign is inside the vehicle and fully portable. They are further designed to be fully transferable to all vehicles. They are further designed to provide a multi-row sign to allow multiple messages at one time.

Primary Elements: Some of the various embodiments of this invention may have the following elements. The systems may include a highly efficient LED (or other illumination technology) sign designed to fit in the windshield of a vehicle. The sign would include LED components have low voltage and low energy consumption. The sign would include LED components that have maximum angle visibility. The sign would include programmable message capability. The sign could be attached to the inside of the window with a system of suction cups and could have flexible frame structure housing that is a combination of support ribs and exterior clear plastic flexible frame. The housing could allow the sign to conform to the contour inside surface of the windshield. The system could be battery powered for portability, and employ solar rechargeable battery and solar panel. The system could also include a day and night sensor, and a timer timer that controls on and off capabilities of the system. The system could include a computer connect connection such as a USB port or wireless connection to allow local or remote laptop or other computer programming of the message displayed by the sign, and could include a highly visible identification number to aid with programming.

Secondary Elements: The system could include a battery system security disabler that would automatically disable the battery and/or the overall system if the system were stolen. The system could also include unique power and other cord connection technology for security.

Substitute Elements: the system could be adapted so that it could be used in the rear or side windows, if needed or desired.

FIG. 1 is an overall representation of one embodiment of a signage system embodying the principles of the present invention. The overall signage system is designated by the numeral 10. The main component of the system 10 is one or more visual display devices or signs 11, 11A, and 11B, each of which is mounted for display behind the windshield 15, 15A, and 15B of one or more vehicles 16, 16A, and 16B. Each vehicle 16, 16A, and 16B, contains substantially identical equipment and will be discussed as represented by vehicle 16 and its equipment. Each sign 11 has a visual display surface 12 that is capable of forming an illuminated visual message 13 or graphic display 13 on the visual display surface 12. In the preferred embodiment, the visual display surface 12 would be placed adjacent the windshield 15 of a vehicle 16 so that the visual display surface 12 would be visible to observers in front of the vehicle 16.

The system 10 might include a Solar Panel Battery Recharger 21 (see FIG. 2) that includes a solar panel 22 that will be mounted in a position in which it will receive sunlight, for example either on the vehicle's exterior, such as the rooftop, hood, or trunk, or in the interior of the vehicle directed to a sun-exposed window.

The system 10 might also include wireless communication hardware 60 (see FIG. 2) and a wireless antenna 61 that allows the visual display 11 to communicate wirelessly with a message programming device 41 such as a laptop computer with message programming capability.

The system 10 might also include suction cups 90 for attachment of the visual display device 11 to the inside surface of the windshield 15 of the vehicle 16.

In the preferred embodiment of this invention, the message programming device 41 would be used to program each of the display devices 11 so that each would have a separate message and each message would scroll from left to right across the display surface 12 in a time coordinated manner so that the message appears to scroll consistently from left to right across the visual field of the plurality of display surfaces 12.

FIG. 2 is a diagrammatic representation of the conceptual relationship between various detailed elements of one embodiment of the present invention. The overall signage system is designated by the numeral 10. The main component of the system 10 is a visual display device or sign 11. The sign 11 has a visual display surface 12 that carries a matrix 13 of illuminatable devices or lamps 14, that are capable of forming a visual message or graphic display on the visual display surface 12 by selective illumination of the lamps 14. In the preferred embodiment, the visual display surface 12 would be placed adjacent the windshield 15 (see FIG. 1) of a vehicle 16 (see FIG. 1) so that the visual display surface 12 would be visible to observers in front of the vehicle 16.

The system 10 might include a Solar Panel Battery Recharger 21 that includes a solar panel 22 that will be mounted in a position in which it will receive sunlight, for example either on the vehicle's exterior, such as the rooftop, hood, or trunk, or in the interior of the vehicle directed to a sun-exposed window. The recharger 21 would also include suitable control electronics 23 to assure that a battery 32 is charged properly.

The system 10 might also include a battery 32, and in particular, a solar powered battery housed in an insulated battery box 33 within the vehicle 16. The system might also include a utility line inverter 34 that converts the voltage from the battery to a different voltage such as 110 volt AC, for use in powering the visual display 11 and the other components of the system.

The system 10 might also include a conventional 110 volt AC plug and power cord 35 that can be used to plug into a conventional electric outlet to provide power to the system 10.

The system 10 might also include the message controller 40 that includes controllers and drive systems 41 that can be programmed to control the illumination function of the visual display.

The system 10 might also include a light sensor 50 to monitor daylight and control operation time of the visual display 12.

The system 10 might also include wireless communication hardware 60 and wireless antenna 61 that allow the message controller 40 to communicate wirelessly with a message programming device 41 such as a laptop computer with message programming capability.

The system 10 might also include a computer connection such as a USB port 70 in th message controller 40 for direct computer laptop connectivity and message programming of the message controller 40.

The system 10 might also include a matrix 80 of illumination devices 81 such as a low voltage, low energy consumption LED light devices with maximum angle visibility, capable, when selectively illuminated to form a visual message or graphic presentation.

The system 10 might also include suction cups 90 for attachment of the visual display device to the inside surface of the windshield 15 of the vehicle 16.

The system 10 might also include a highly visible identification number 100 that specifically identifies the visual display device and provides for efficient identification and programming of the device.

The system 10 might also include a forwardly directed shade frame or structure 110, that includes a top shade 111, a left side shade 112, a right side shade 113, and a bottom shade 114. It has been found that this shade structure improves the visibility of the message on the display surface 12 by blocking off axis light and thereby reducing glare on the display surface. This shade structure 110 also provides some mechanical protection for the display surface 12 and its elements.

FIG. 3 shows a sectional right elevation view of the system 10 shown in FIG. 2 as viewed a long line III-III. In FIG. 3, the shade frame 110 can be shown. It can be seen that the top shade 111 extends forward of the display surface 12 by 1 to 6 inches, to reduce the amount of off axis incident light that would cause glare on the display surface 12. The left side shade 112 extends forward of the display surface 12 by 1 to 6 inches, at the top to about 1 inch at the bottom, to reduce the amount of off-axis incident light that would cause glare on the display surface 12. The right side shade 113 (not shown) is similarly arranged. The bottom shade 114 extends forward of the display surface 12 by about 1 inch from the display surface 12.

It can be seen that the suction cup 90 is attached to the top shade 111 by means of an adjustable structure 120 that allows the physical relationship between the suction cup 90 and the display device 11 to be adjusted to allow appropriate positioning of the display device 11 with respect to the windshield 15, when the suction cup is used to attach the display device 11 to the windshield 15.

The signage system 10 of the present of invention might assume several distinct forms. In the simplest form, the sign would be positioned inside a vehicle to present its message through the windshield of a vehicle and be programmed by a local programming device such as a computer, through a local wired or wireless connection, so that a message, either stationary or changing, could be displayed by the sign. A local programming device is a programming device that, during programming, is either within or immediately adjacent, the vehicle In another form of the system, the system described above could have a wireless connection with sufficient range so that the sign could be programmed by a remote programming device or computer. A remote programming device is a programming device that, during programming, is either within a separate vehicle or structure different from the said vehicle, or at least 3 meters from the said vehicle.

In another form of the system, the system includes a plurality of vehicles, each one with a visual display device visible through the windshield, and each vehicle including a local programming device that is capable of programming its display device in the associated vehicle so that each vehicle has with identical or different display messages. In the preferred implementation of this version, each visual display would be programmed to have a different and moving signal, and the moving signals on the various display devices would be coordinated so that the message appeared to move in a coordinated fashion across the visual field of the plurality of vehicles windshields. This provides a very dramatic and attractive visual effect.

In another form of the system, the system includes a plurality of vehicles, each one with a visual display device visible for the windshield, and the system includes a remote central programming device that is capable of programming each display device in each vehicle simultaneously or separately, with identical or different display messages. In the preferred implementation of this version, each visual display would be programmed to have a different and moving signal, and the moving signals on the various display devices would be coordinated so that the message appeared to move in a coordinated fashion across the visual field of the plurality of vehicles windshields. This provides a very dramatic and attractive visual effect.

While it will be apparent that the illustrated embodiments of the invention herein disclosed are calculated adequately to fulfill the object and advantages primarily stated, it is to be understood that the invention is susceptible to variation, modification, and change within the spirit and scope of the subjoined claims. It is obvious that minor changes may be made in the form and construction of the invention without departing from the material spirit thereof. It is not, however, desired to confine the invention to the exact form herein shown and described, but it is desired to include all such as properly come within the scope claimed.

What I claim as my invention is:

1. A signage system, comprising:
   a) a plurality of stationary and parked vehicles with the ignition off, facing the same direction, parked in an automobile sales lot with the front of each vehicle facing a road, each having a windshield,
   b) a plurality of signs, each sign having a visual display surface that is capable of forming an illuminated graphic display on the visual display surface, each sign being mounted for display adjacent the inside surface of the windshield of one of the plurality of vehicles, so that the visual display surfaces of the plurality of signs are parallel, symmetric about a horizontal line of the visual display surfaces, and simultaneously visible to observers situated in front of the vehicles on a road, with the visual display surface substantially covering the entire windshield,
   c) a plurality of message controllers, each adapted to determine the graphic display on one of the plurality of signs,
   d) a single message programming device adapted to instruct the plurality of message controllers concerning the graphic display that each message controller determines for its associated sign,
   e) a vehicle marketing and sales message appropriate for the plurality of vehicles in which the signs are installed, each sign displaying a portion of the message, with the complete message spanning the plurality of signs,
   f) the vehicle marketing and sales message consisting of a single line of characters which are dimensionally substantially the full height of the visual display surface, and
   g) the message transverses along the horizontal line of the visual display surfaces.

2. A signage system as recited in claim 1, wherein each display surface carries a matrix of highly energy efficient illumination devices that, when selectively illuminated, form the graphic display.

3. A signage system as recited in claim 2, wherein the illumination devices are light emitting diodes.

4. A signage system as recited in claim 1, wherein each vehicle includes a battery and a solar panel that provides electric power to the battery to power the sign.

5. A signage system as recited in claim 1, wherein each sign includes a suction cup for holding the sign to the inside of the windshield.

6. A signage system as recited in claim 1, wherein each message controller and the message programming device each include a wireless communication capability that allows the message programming device to communicate wirelessly with each message controller, and thereby program each message controller remotely.

7. A signage system as recited in claim 1, wherein each visual display surface of the sign includes a forwardly directed shade frame that protects the display surface from off axis light and thereby minimizes the glare on the display surface and maximizes the visibility of the graphic display.

8. A signage system as recited in claim 1, wherein the system includes a light sensor to monitor daylight and control the operation time of the visual display surfaces.

9. A signage system as recited in claim 1, wherein the system includes a
   light sensor to monitor daylight and control the intensity of the visual display surfaces.

10. A signage system as recited in claim 1, wherein each sign includes a highly visible identification number that specifically identifies the sign and provides for efficient identification and programming of the sign.

11. A signage system as recited in claim 1, wherein two of the signs are programmed with different graphic displays, the graphic displays are time coordinated so that the combined graphical display creates a dynamic visual effect.

12. A signage system as recited in claim 11, wherein two of the signs are positioned so that they simultaneously face and are simultaneously viewable by an observer outside of and in front of the vehicles, and the signs are precisely programmed, using a single message programing device, with different graphic displays, the graphic displays being time coordinated so that the combined graphical display creates a dynamic visual effect wherein the graphic display appears to move from one sign to the other.

13. A signage system as recited in claim 11, wherein two of the signs are positioned so that they simultaneously face and are simultaneously viewable by an observer outside of and in front of the vehicles, and the signs are precisely programmed, using a single message programing device, with different graphic displays, the graphic displays being time coordinated so that the combined graphical display creates a dynamic visual effect wherein the graphic display appears to move from one sign to the other and back again.

14. A signage system as recited in claim 1, wherein three of the signs are positioned so that they simultaneously face and are simultaneously viewable by an observer outside of and in front of the vehicles, and the signs are each precisely programmed, using a single message programming device, with different graphic displays, the graphic displays being time coordinated so that the combined graphical display creates a dynamic visual effect wherein the graphic display appears to move from the first sign to the second sign, and then to the third sign.

* * * * *